United States Patent [19]

Adkins

[11] 4,398,010

[45] Aug. 9, 1983

[54] METHOD FOR ACCELERATING THE ACTIVITY OF A HYDROSILATION CATALYST

[75] Inventor: James R. Adkins, Adrian, Mich.

[73] Assignee: SWS Silicones Corporation, Adrian, Mich.

[21] Appl. No.: 328,162

[22] Filed: Dec. 7, 1981

[51] Int. Cl.$^3$ ............................................. C08G 77/06
[52] U.S. Cl. ................................. 528/15; 260/429 R; 528/32; 528/33; 528/25; 556/479; 556/481
[58] Field of Search ............... 260/429 R; 528/15, 32, 528/33, 25; 556/479, 481

[56] References Cited

U.S. PATENT DOCUMENTS 3,715,334  2/1973  Karstedt ........................... 528/31
3,795,656  3/1974  Martin .............................. 528/15

Primary Examiner—Melvyn I. Marquis

[57] ABSTRACT

A method for improving the activity of a platinum catalyst in promoting the addition of Si-bonded hydrogen atoms to compounds containing aliphatic unsaturation which comprises reacting an ammonium platinum silicon complex with a compound containing aliphatic unsaturation in the presence of a basic compound.

15 Claims, No Drawings

METHOD FOR ACCELERATING THE ACTIVITY OF A HYDROSILATION CATALYST

The present invention relates to a hydrosilation catalyst, and more particularly to a method for improving the activity of a hydrosilation catalyst in promoting the addition of silicon bonded hydrogen atoms to compounds containing aliphatic unsaturation.

BACKGROUND OF THE INVENTION

Heretofore various platinum compounds and complexes thereof have been used as catalysts in the preparation of various organosilicon compounds. Examples of some of the platinum compounds and complexes which have been used as catalysts are chloroplatinic acid, platinum chloride-cyclopropane and platinum complexes which have been prepared by reacting alcohols, ethers and aldehydes with chloroplatinic acid as well as platinum supported catalysts.

Chloroplatinic acid is generally one of the more useful catalysts but it has certain disadvantages. For example, chloroplatinic acid is insoluble in many organic materials and it is not always effective at low concentrations. These disadvantages have led to the discovery of the aformentioned organic platinum complexes. While these complexes provide certain improvements over chloroplatinic acid, they have certain disadvantages. For example, complexes such as disclosed in U.S. Pat. No. 3,220,970 to Lamoreaux, require long reaction times at elevated temperatures. Moreover, if the temperature is allowed to go above the parameters described, then metallic platinum is often obtained due to decomposition. Generally, a number of addition reactions are best effected, irrespective of the catalyst, at temperatures well above the temperature parameters described for making the catalyst in U.S. Pat. No. 3,220,970 to Lamoreaux. Consequently, the character of the platinum complex changes considerably under these conditions. Although these platinum complexes are more soluble than chloroplatinic acid in organic solvents, they are not sufficiently soluble in organosilicon compounds, especially organosilicon polymer systems where silicon bonded hydrogen groups are added to unsaturated organic compounds.

Platinum complexes of unsaturated siloxanes are described in U.S. Pat. No. 3,715,334 to Karstedt, in which a platinum halide is reacted with an unsaturated silicon material and the resultant complex is then treated with a base to remove the available inorganic halogen.

Other platinum catalysts which promote hydrosilation of unsaturated organic compounds are described in U.S. Pat. No. 3,795,656 to Martin, in which ammonium platinum organosilicon complexes are prepared by reacting chloroplatinic acid with an aminofunctional silicon compound. Although these ammonium platinum organosilicon complexes are effective in promoting the hydrosilation of unsaturated compounds, they are too slow for certain applications, such as in preparing dental impressions. Merely increasing the concentration of the platinum catalyst has not, in some instances, increased the rate of hydrosilation. In fact, it has been found that when the concentration of the platinum catalyst, has been increased beyond a certain range, the rate of hydrosilation has not been accelerated and often times has even slowed the reaction down to such a rate that it is no longer effective as a catalyst for hydrosilation.

Furthermore, it is known that nitrogen containing compounds retard room temperature curing of a system which cures by platinum catalyzed hydrosilylation of unsaturated organic compounds. For example, U.S. Pat. No. 3,192,181 discloses that benzotriazole will completely prevent room temperature curing of a platinum catalyzed hydrosilylation system. Likewise, U.S. Pat. No. 3,723,567 discloses that amine-functional silanes will inhibit room temperature curing of a platinum catalyzed hydrosilylation system. Thus, it is surprising that an ammonium platinum silicon complex containing nitrogen can be activated to effect hydrosilation at room temperature.

Therefore, it is an object of this invention to provide a novel catalyst. Another object of this invention is to provide a catalyst for effecting the addition of organosilicon compounds to unsaturated organic compounds at room temperature. Still another object of this invention is to provide an ammonium platinum silicon complex as catalysts for effecting the addition of silicon bonded hydrogen compounds to aliphatic unsaturated organic compounds. A further object of this invention is to provide a catalyst system which is soluble in both organic solvents and organosilicon compounds. A still further object of this invention is to provide a catalyst which is more stable at elevated temperatures for longer periods of time.

SUMMARY OF INVENTION

The foregoing objects and others which will become apparent from the following description are accomplished in accordance with this invention, generally speaking, by providing ammonium platinum complexes of organosilicon compounds which are prepared by (1) reacting a platinum halide with an aminofunctional silicon compound at a temperature of from 0° to 150° C. to form an ammonium platinum complex and (2) reacting the ammonium platinum complex with a compound having aliphatic unsaturation in the presence of a basic compound to form a platinum complex having improved hydrosilylation activity. The resultant platinum complexes may be used in hydrosilylation reactions to promote the addition of silicon compounds having ≡Si—H bonds to compounds having aliphatic unsaturation.

DETAILED DESCRIPTION OF INVENTION

Although it has been known that amines inhibit the catalytic activity of platinum catalysts, surprisingly it has been found that the activity of the catalysts may be substantially improved by reacting an ammonium platinum organosilicon complex with a compound having aliphatic unsaturation in the presence of a basic compound.

The platinum complexes employed in this invention are preferably prepared by reacting chloroplatinic acid with aminofunctional silicon compounds to form ammonium platinum silicon complexes which are then reacted with a basic compound and a compound having aliphatic unsaturation. The ammonium platinum silicion complexes may be reacted with the compound having aliphatic unsaturation before, during or after the ammonium platinum silicon complexes are reacted with a base.

Examples of suitable basic compounds which may be employed are alkali metal carbonates, such as sodium carbonate, potassium carbonate, sodium bicarbonate; alkaline earth metal carbonates, such as calcium carbonate and barium carbonate; alkali metal hydroxides, such as potassium hydroxide, sodium hydroxide and lithium hydroxide.

The amount of basic compound employed should be in excess of that required to neutralize all the available halogen. Even though less than a stoichiometric amount can be employed, it is preferred that a stoichiometric amount or even an excess be employed in order to neutralize the available halogen and form the corresponding salts.

Compounds containing aliphatic unsaturation which may be reacted with the ammonium platinum silicon complexes in the presence of a basic compound to form the platinum complexes of this invention are unsaturated silanes of the formula $R_aR_b'SiX_{4-a-b}$ and unsaturated siloxanes of the formula

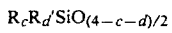

$$R_cR_d'SiO_{(4-c-d)/2}$$

where R is a monovalent hydrocarbon radical or a halogenated monovalent hydrocarbon radical which is free of aliphatic unsaturation, R' is a monovalent hydrocarbon radical containing aliphatic unsaturation, X is a hydrolyzable radical, a has a value of from 0 to 2, b has a value of from 1 to 4 and the sum of a+b is equal to from 1 to 4, c has a value of from 0 to 2, d has a value of from 0.0002 to 3 and the sum of c+d is equal to from 1 to 3.

Radicals represented by R are alkyl radicals having up to 18 carbon atoms, e.g., methyl, ethyl, propyl, octyl and octadecyl radicals; cycloalkyl radicals such as cyclohexyl and cycloheptyl radicals; aryl radicals such as the phenyl radical; aralkyl radicals such as the benzyl, and phenylethyl, and phenylpropyl radicals; alkaryl radicals such as the tolyl, xylyl, cumenyl, ethylphenyl radicals; haloaryl and haloalkyl radicals such as the chlorophenyl, chloromethyl and dibromophenyl radicals.

Radicals represented by R' are aliphatically unsaturated radicals such as the vinyl, allyl, butenyl radicals and cycloalkenyl radicals such as cyclopentyl, cyclohexenyl, cycloheptenyl and the cyclooctenyl radicals.

Examples of unsaturated silanes are tetravinylsilane, triallylmethylsilane, divinyldimethylsilane, trivinylphenylsilane, divinylmethylphenylsilane, cyclohexenyldimethylchlorosilane, divinylmethylchlorosilane, trivinylchlorosilane, divinylmethylmethoxysilane, and the like.

Examples of unsaturated siloxanes are disiloxanes such as 1,1-divinyltetramethyldisiloxane, 1,2-divinyltetramethyldisiloxane, hexavinyldisiloxane, 1,1,2 trivinyltrimethyldisiloxane, and 1,1,2,2-tetravinyldimethyldisiloxane. An example of an unsaturated cyclic siloxane is the cyclic trimer of methylvinylsiloxane, the cyclic tetramer of methylvinylsiloxane and the cyclic tetramer of vinylphenylsiloxane.

Examples of unsaturated organopolysiloxanes having at least one unsaturated organic radical per molecule linked to the silicon atom are trialkylsiloxy end-blocked methylvinyl siloxanes and dimethylpolysiloxanes having vinyldimethylsiloxy terminal units with a viscosity of from 5 to 100,000 cs. at 25° C.

Suitable examples of other compounds having olefinic unsaturation which may be reacted with the ammonium platinum silicon complexes are alkenes having from 2 to 8 carbon atoms, cycloalkenes having from 3 to 5 carbon atoms and substituted monocyclic aromatic hydrocarbons having from 8 to 10 carbon atoms.

Examples of suitable alkenes are ethylene, propylene, butylene and octylene. Examples of suitable cycloalkenes are cyclopropene, cyclobutane and cyclopentene. Suitable examples of substituted monocyclic aromatic hydrocarbons are divinylbenzene, styrene and ring substituted styrenes such as m-methylstyrene, p-methylstyrene, and p-ethoxystyrene.

The amount of compound containing olefinic unsaturation employed in the reaction with the ammonium platinum silicon complex is not critical; however, a compound having at least one olefinically unsaturated group should be present in an amount so that at least 3 olefinic groups and as much as 6 to 8 olefinic groups are present per gram atom of platinum.

In the process of this invention, the ammonium platinum silicon complex is reacted with a compound having olefinic unsaturation and a basic compound in the absence or presence of an organic solvent at a temperature of from 0° to 150° C., preferably at a temperature of from 35° to 130° C. and more preferably at a temperature of from 50° to 100° C., to form a a platinum complex which may be used as a catalyst in hydrosilylation reactions.

The aminofunctional silicon compounds used in the preparation of the ammonium platinum silicon complexes are prepared, for example, by equilibrating a mixture containing an organopolysiloxane and an aminofunctional silane or siloxane in the presence of an equilibration catalyst in accordance with the method described in U.S. Pat. No. 3,890,269 to Martin, which is also incorporated herein by reference.

Aminofunctional silicon copolymers may also be employed in the preparation of the platinum complexes of this invention. These copolymers are prepared by contacting an aminofunctional silane or the corresponding siloxane with an organosiloxane in a liquid phase in accordance with the procedure described in U.S. Pat. No. 3,355,424 to Brown. Generally, the reaction will proceed rather slowly at room temperature, however, the reaction rate may be accelerated by heating the reaction mixture at temperatures of from 50° to about 200° C.

Also, ammonium platinum complexes which are obtained from the reaction of platinum halides with tertiary aminoorganosilicon compounds having at least one ether linkage in the organic group connecting the tertiary amino group to the silicon atoms may be used in the process of this invention.

These tertiary aminosiloxanes may be prepared in accordance with the procedure described in U.S. Pat. No. 3,042,191 to Morehouse. Generally, temperatures of from 100° to about 160° C. are preferred and solvents such as alcohols, e.g., ethanol; aromatic hydrocarbons, such as toluene and ethers such as ethylene glycol dimethyl ether can be employed, particularly where the reactants are incompatible and/or it is desired to minimize crosslinking. It is preferred that the addition reaction be conducted under an atmosphere of an inert gas to minimize side reactions.

The ammonium platinum silicon complexes employed in preparing the catalysts of this invention may be prepared in accordance with the procedure described in U.S. Pat. No. 3,795,656 to Martin, which is incorporated herein by reference.

Also, the ammonium platinum silicon complexes may be prepared by reacting a platinum halide with aminofunctional organopolysiloxane copolymers obtained from the partial hydrolysis and condensation of a liquid silanol chain-stopped polydiorganosiloxane and an aminoalkoxyalkylsilane or an aminoalkoxyalkenylsilane and an aminoalkylsilane, if desired, in accordance with the procedure described in U.S. Pat. No. 3,544,498 to Holdstock et al. In the process described in U.S. Pat. No. 3,544,498, a mixture containing a chain-terminated polyorganosiloxane, an aminoalkoxyalkylsilane or aminoalkoxyalkenylsilane and if desired, an aminoalkylsilane is partially hydrolyzed and condensed by adding a sufficient amount of water to provide the degree of hydrolysis and condensation desired.

The ammonium platinum silicon complexes of this invention are effective catalysts for the room temperature addition of organosilicon compounds containing a silicon-bonded hydrogen to organic compounds having carbon-to-carbon unsaturation.

Suitable monomeric silicon compounds and organosilicon compounds containing silicon-bonded hydrogen atoms which may be used in the hydrosilylation reaction are those represented by the formula

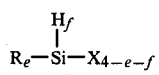

$$R_e-Si-X_{4-e-f}$$ with $H_f$ wherein R is as defined above, X is a hydrolyzable group, such as halogen, alkoxy radicals, aryloxy radicals and acyloxy (OOCR) radicals; e is a number of from 0 to 3, f is a number of from 1 to 3; and the sum of e and f is from 1 to 4. Where more than one R radical is present in the compound the various R radicals may be the same or different.

Among the radicals represented by R are alkyl radicals, e.g., methyl, ethyl, propyl, octyl, octadecyl radicals; cycloalkyl radicals such as cyclohexyl and cycloheptyl radicals; aryl radicals such as the phenyl radical; aralkyl radicals such as the benzyl, phenylethyl and phenylpropyl radicals; alkaryl radicals such as the tolyl, xylyl and ethylphenyl radicals; haloaryl radicals and haloalkyl radicals such as the chlorophenyl, chloromethyl and dibromophenyl radicals. In the preferred embodiment, R is a methyl or a mixture of methyl and phenyl radicals.

Examples of suitable SiH containing silicon compounds which can be employed in the present invention are methyldichlorosilane, phenyldichlorosilane, diethylchlorosilane, dimethylethoxysilane, diphenylchlorosilane, dichlorosilane, dibromosilane, pentachlorodisiloxane and the like.

Suitable SiH containing compounds useful in the practice of the present invention are those in which each molecule contains at least one silicon-bonded hydrogen. Included in this category are organopolysiloxanes.

Suitable examples of organopolysiloxanes are polymers and copolymers containing up to one or more of the units having the formulas: $R_3SiO_{0.5}$, $R_2SiO$, $RSiO_{1.5}$ or $SiO_2$ along with at least one unit per molecule having the formulas: $RHSiO$, $R_2HSiO_{0.5}$, $HSiO_{1.5}$, $H_2SiO$ or $RH_2SiO_{0.5}$ where R is the same as above. Any of the SiH containing compounds described above, are operative in the practice of this invention, however, it is preferred that the SiH containing compound be an organopolysiloxane such as an organopolysiloxane having the units $(RHSiO)_n$ or an organopolysiloxane polymer or copolymer having the formula $R_xSiH_yO_{(4-x-y)/2}$ wherein R is the same as above; n is a number of from 1 to 20,000, x is a number of from 0.5 to 2.49, y is a number of from 0.001 to 1 and the sum of x+y is a number equal to from 1 to 2.5.

Any compound containing aliphatic unsaturation, particularly compounds containing olefinic or acetylenic unsaturation can be employed in the addition reaction with the compounds containing silicon-bonded hydrogen. These compounds can be monomeric or polymeric materials and they can contain only carbon and hydrogen or they may also contain another element or elements. When the aliphatically unsaturated compounds contain an element other than carbon and hydrogen, it is preferred that the other element be oxygen, halogen, nitrogen, silicon or mixtures thereof. Aliphatically unsaturated compounds can contain one or more pairs of carbon atoms linked by multiple bonds. Among the many unsaturated hydrocarbons which may be used in the present invention are ethylene, propylene, butylene, octylene, styrene, butadiene, pentadiene, 2-pentene, 2-divinylbenzene, vinyl acetylene and the like. Preferably the unsaturated compound does not contain more than about 24 carbon atoms in the chain.

Included in the oxygen containing unsaturated compounds which may be employed in the practice of this invention are methylvinyl ether, divinyl ether and the like; alkylethers of an alkylene glycol, allyl aldehyde, methylvinyl ketone, phenylvinyl ketone, acrylic acid, methacrylate, phenylmethacrylate, vinylacetic acid, vinyl octoate, vinyl acetate, maleic acid, linoleic acid and the like. Other unsaturated compounds which may be employed are cyclic and heterocyclic materials containing aliphatic unsaturation in the ring, such as, cyclohexene, cycloheptene, cyclopentadiene, dihydrofuran, dihydropyrene and the like. Sulfur analogues of the unsaturated oxygen containing materials may also be employed in the practice of this invention. In addition to compounds containing carbon, hydrogen, oxygen and sulfur, compounds containing other elements may also be employed. Thus, halogenated derivatives of any of the materials described above can be employed including the acyl chlorides as well as compounds containing a halogen substituent on a carbon atom. Thus, halogen containing materials include, for example, vinyl chloride, the vinyl chlorophenyl esters, the allyl esters of trichloroacetic acid and the like.

Other types of unsaturated materials which are useful in the practice of this invention include compounds containing nitrogen substituents such as acrylonitrile, allylcyanide, nitroethylene and the like. Unsaturated polymeric materials containing aliphatic unsaturation such as polyester resins prepared from polybasic saturated or unsaturated acids and polyhydric unsaturated alcohols may also be used in the practice of this invention.

Other unsaturated compounds which may be used in the practice of this invention are those compounds containing silicon such as the material commonly referred to as organosilicon monomers or polymers. For example, the unsaturated organosilicon compounds may be identical to the silicon compounds containing silicon-bonded hydrogen, except that the silicon bonded hydrogen is replaced by silicon bonded organic radicals containing at least one carbon-to-carbon multiple bond. Although it is preferred that the organosilicon compounds be free of silicon bonded hydrogen atoms, organosilicon compounds containing both silicon bonded hydrogen atoms and silicon bonded unsaturated radicals may be used. It is essential that these unsaturated silicon compounds have at least one unsaturated organic radical attached to a silicon atom per molecule. Thus, the unsaturated organosilicon compounds include silanes, siloxanes, silazanes, as well as monomeric or polymeric materials containing silicon atoms joined together by alkylene or arylene groups.

Examples of suitable unsaturated silicon compounds which may be used are methylvinyldichlorosilane, vinyltrichlorosilane, allyltrichlorosilane, methylphenylvinylchlorosilane, phenylvinyldichlorosilane, diallyldichlorosilane, vinylcyanoethyldichlorosilane, cyclic polysiloxanes such as the cyclic trimer of methylvinylsiloxane, cyclic tetramer of methylvinylsiloxane, cyclic pentamer of methylvinylsiloxane, cyclic tetramer of vinylphenylsiloxane and the like.

The ratio of the SiH containing compound and the unsaturated compound can vary over a wide range. Generally, one silicon hydrogen bond is equivalent to one olefinic double bond or one-half of an acetylenic triple bond so that this equivalency establishes the general order of magnitude of the two reactants employed. However, for many purposes it may be desirable to employ an excess of one of the reactants to facilitate the completion of the reaction. In general, however, the ratio of the reactants is selected so that from about 0.5 to 20 silicon-bonded hydrogen atoms are present for each unsaturated carbon-carbon double bond and from about 1.0 to 15 silicon-bonded hydrogen atoms are present for each carbon-carbon triple bond.

To effect the addition reactions of the organosilicon compositions in the presence of the ammonium platinum silicon complexes of this invention, the reactants and catalyst are mixed and reacted at the desired temperature, generally of from about 25° to 150° C. The time required for the addition reaction to occur is a function of the temperature, that is, at a temperature range of from 25° to 100° C., the reaction time varies from a few minutes up to about 15 minutes or more depending upon the reactants involved.

In some cases, it is desirable to employ a solvent for one or both reactants. The amount of solvent employed is not critical and may vary over a wide range. Obviously, the same material may in some cases serve both as the reactant and as the solvent.

The amount of catalyst employed can vary over a wide range. It is preferred that the ammonium platinum silicon complex be employed in such an amount that from about 0.1 to 500 parts per million (ppm) of platinum be present in the mixture and more preferably from about 1 to 300 ppm by weight of elemental platinum be present in the mixture containing the SiH containing compound and the compound having aliphatic unsaturation.

The compositions of this invention may also contain other additives such as fillers, i.e., silica hydrogels, aerogels and silicas which have been treated with, for example trimethylchlorosilane or hexamethyldisalazane to impart hydrophobic properties thereto, quartz, alumina, glass fibers, diatomaceous earth, organosilicon plasticizers, UV stabilizers, heat stabilizers and the like. Other additives which may be included in the compositions are those which retard or inhibit the addition of silicon-bonded hydrogen to an aliphatic multiple bond at room temperature. Examples of such additives are benzotriazole, 1,3-divinyl-1, 1,3,3-tetramethydisiloxane and/or 2-methyl-3-butyn-2-ol.

When the compositions of this invention are to be stored for a period of time prior to use it is preferred that the catalyst be mixed with a portion of the organosilicon compound containing olefinic unsaturation and stored in one package. The remainder of the organosilicon compound containing olefinic unsaturation is preferably mixed with the organosilicon compound containing silicon-bonded hydrogen and stored as a second package. The two packages can then be mixed together just prior to use. If other materials are to be added to the composition, they are preferably incorporated in the individual packages during their preparation rather than adding those materials during the final mixing of all the ingredients.

One of the advantages of the novel catalysts of this invention is that they will effect the desired hydrosilylation reaction between the silicon-bonded hydrogen compound and the unsaturated compound at room temperature and in very small quantities. In addition, it has been found that hydrosilation may be accelerated using the catalysts of this invention. Also, crosslinking of compositions comprising silicon-bonded hydrogen containing organopolysiloxanes and vinyl containing organopolysiloxanes may be accelerated to the extent that these compositions may be used as potting or encapsulating compositions for electrical components on assembly lines. Moreover, compositions containing organopolysiloxanes having SiH groups and organopolysiloxanes containing aliphatic unsaturation can be crosslinked at room temperature in the presence of the catalysts of this invention and used as sealants and coatings.

Various embodiments of this invention are further illustrated in the following examples in which all parts are by weight unless otherwise specified.

PREPARATION OF AMMONIUM PLATINUM COMPLEX (a) An aminofunctional silicon compound is prepared by heating a mixture containing about 133.2 parts of octamethylcyclotetrasiloxane, 11.2 parts of B-(aminoethyl)-r-aminopropyltrimethoxysilane and 0.15 part of potassium hydroxide to a temperature of 145° C. for three hours. After cooling the liquid product to room temperature, 0.15 part of acetic acid is added to neutralize the reaction mixture. The product is filtered and a liquid product having a viscosity of about 40 cs. at 25° C. is recovered. Nuclear Magnetic Resonance analysis of the product shows the ratio of aminopropyl groups to $OCH_3$ to $(CH_3)_2SiO$ groups is about 1:3:36.

About 15.4 parts of the aminofunctional silicon compound prepared above is added to a reactor under an atmosphere of nitrogen. About 78.4 parts of isopropanol, 1.6 parts of chloroplatinic acid hexahydrate, and 26.0 parts of toluene are added to the reactor and the reaction mixture is stirred for 30 minutes at 27° C.

The resultant solution is removed from the reactor and the solvent distilled off at a temperature of about 30° C. at 0.25 mm Hg pressure over a period of 4 hours. The resulting product is a transparent orange color. Infrared analysis confirms the presence of the ammonium ion. The product contains about 3.0 weight percent of elemental platinum.

(b) About 28.8 parts of an aminofunctional dimethylpolysiloxane fluid prepared in accordance with the procedure described in (a) above and having a ratio of N,B-(aminoethoxy)-r-aminopropyl groups to methoxy groups to $(CH_3)_2SiO$ groups of 1:3:192 and a viscosity of 290 centistokes at 25° C. are added to a reactor under an atmosphere of nitrogen. About 1.04 parts of chloroplatinic acid hexahydrate, 19.8 parts of isopropanol and 21.8 parts of toluene are added to the reactor and the reaction mixture is stirred for 30 minutes at 30° C. The resultant solution is a transparent, orange colored liquid, which contains 0.56 weight percent of elemental platinum.

(c) The procedure of Example (b) is repeated, except that an aminofunctional dimethylpolysiloxane polymer of the formula

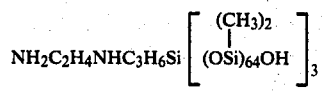

is substituted for the aminofunctional dimethylpolysiloxane fluid. The aminofunctional dimethylpolysiloxane polymer is prepared by condensing a silanol terminated fluid with N,B-(aminoethoxy)-r-aminopropyltrimethoxysilane.

PREPARATION OF AMMONIUM PLATINUM SILICON COMPLEX

Example 1

To about 100 parts of the ammonium platinum complex prepared in (a) above are added 100 parts of ethyl alcohol, 3 parts of sodium bicarbonate and 10 parts of divinyltetramethyl disiloxane with agitation. The mixture is refluxed for about 0.5 hour, cooled to room temperature and filtered. The filtrate was then placed on a rotary evaporator and the volatiles removed under vacuum. A yellow liquid is obtained.

Example 2

The procedure of Example 1 is repeated except that 100 parts of the ammonium platinum complex prepared in (b) above are substituted for the ammonium platinum complex prepared in (a) above.

Example 3

The procedure of Example 1 is repeated except that 100 parts of the ammonium platinum complex prepared in (c) above are substituted for the ammonium silicon complex prepared in (a) above.

Example 4

The procedure of Example 1 is repeated except that 100 parts of a vinyl endblocked dimethylpolysiloxane having a viscosity of 500 cs. at 25° C. is substitutedd for the 100 parts of divinyltetramethyl disiloxane. The resultant platinum catalyst is yellow in color and contains 2130 parts per million of elemental platinum.

Example 5

The procedure of Example 1 is repeated except that 100 parts of styrene are substituted for the divinyltetramethyl disiloxane.

Example 6

The ammonium platinum silicon complexes prepared in the above examples are mixed with 100 parts of a vinyl terminated dimethylpolysiloxane fluid having a viscosity of 500 cs. at 25° C. in such an amount that 10 parts of elemental platinum are present per million parts of the vinyl terminated dimethylpolysiloxane.

To each of the above described platinum containing organopolysiloxane mixtures are added 6 parts of a methylhydrogenpolysiloxane fluid having a viscosity of 50 cs. at 25° C. and mixed at room temperature. The time required before crosslinking was observed, i.e., "working time" of the various platinum containing organopolysiloxane mixtures is shown in the following table.

| Catalyst Example No. | Working Time |
| --- | --- |
| 1 | 1 minute |
| 2 | 2 minutes |
| 3 | 2 minutes |
| 4 | 3.5 minutes |
| 5 | 3 minutes |
| Comparison Examples | |
| (a) | 30 minutes |
| (b) | 15 minutes |
| (c) | 30 minutes |

What is claimed is:

1. A method for accelerating the hydrosilylation activity of a nitrogen containing platinum catalyst which comprises reacting an ammonium platinum silicon complex with a compound containing olefinic unsaturation which is selected from the group consisting of silanes, siloxanes and organic hydrocarbons having up to 10 carbon atoms and a basic compound selected from the group consisting of alkali metal carbonates, alkaline earth metal carbonates and alkali metal hydroxides, said ammonium platinum silicon complex is obtained from the reaction of a platinum halide and an aminofunctional silicon compound.

2. The method of claim 1, wherein the ammonium platinum silicon complex is reacted with the compound containing olefinic unsaturation and thereafter the resultant composition is reacted with a basic compound.

3. The method of claim 1, wherein the ammonium platinum complex is reacted with a basic compound and thereafter the resultant composition is reacted with a compound containing olefinic unsaturation.

4. The method of claims 1, 2 or 3, wherein the reaction is conducted in the presence of a solvent.

5. The method of claims 1, 2 or 3, wherein the ammonium platinum silicon complex is obtained from the reaction of chloroplatinic acid and an aminofunctional silicon compound selected from the group consisting of aminofunctional silanes and aminofunctional siloxanes.

6. The method of claim 1, wherein the reaction is conducted at a temperature of from 0° to 150° C.

7. The method of claim 1, wherein the reaction is conducted in the presence of a solvent and at the reflux temperature of the solvent.

8. The catalyst obtained from the method of claim 1.

9. A method for preparing organosilicon compounds having carbon-silicon bonds which comprises contacting a silicon compound having at least one ≡SiH bond per molecule which is selected from the group consisting of silanes of the formula

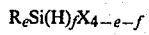

and siloxanes of the formula PS
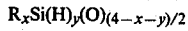

in which R is selected from the group consisting of a monovalent hydrocarbon radical and a halogenated monovalent hydrocarbon radical having from 1 to 18 carbon atoms, X is a hydrolyzable group, e is a number of from 0 to 3, f is a number of from 1 to 3 and the sum of e and f is from 1 to 4, x is a number of from 0.5 to 2.49, y is a number of from 0.001 to 1 and the sum of x+y is a number of from 1 to 2.5 with a compound having at least one aliphatically unsaturated carbon-to-carbon bond in the presence of the platinum catalyst of claim 1.

10. The method of claim 9, wherein the silicon compound is a silane of the formula $$R_e Si(H)_f X_{4-e-f}$$

in which R is selected from the group consisting of a monovalent hydrocarbon radical and a halogenated monovalent hydrocarbon radical having from 1 to 18 carbon atoms, X is a radical selected from the class consisting of halogen, alkoxy radicals, aryloxy radicals and acyloxy radicals, e is a number of from 0 to 3, f is a number of from 1 to 3 and the sum of e+f is a number of from 1 to 4.

11. The method of claim 9, wherein the silicon compound is a siloxane of the formula Ti $R_x Si(H)_y (O)_{(4-x-y)/2}$ in which R is selected from the group consisting of a monovalent hydrocarbon radical and a halogenated monovalent hydrocarbon radical having from 1 to 18 carbon atoms, x is a number of from 0.5 to 2.49, y is a number of from 0.001 to 1.0 and the sum of x+y is a number of from 1.0 to 2.5.

12. The method of claim 9, wherein the organic compound is a silicon compound having at least one unsaturated carbon-to-carbon bond.

13. The method of claim 9, wherein the silicon compound having at least one ≡Si—H bond per molecule is reacted with the compound having at least one aliphatically unsaturated carbon-to-carbon bond in the presence of the platinum catalyst at a temperature of from 25° to about 150° C.

14. The method of claim 9, wherein from 0.5 to 20 silicon bonded hydrogen atoms are present for each aliphatically unsaturated carbon-to-carbon double bond present in the compound.

15. The method of claim 9, wherein the amount of ammonium platinum silicon complex ranges from about 0.1 to 500 parts per million of elemental platinum based on the weight of the silicon compound containing at least one ≡SiH bond per molecule and the compound containing at least one aliphatically unsaturated carbon-to-carbon bond.

* * * * *